July 16, 1957  J. E. FLEURY  2,799,749
HORIZONTAL TYPE THERMOSTAT
Filed Jan. 27, 1956  2 Sheets-Sheet 1
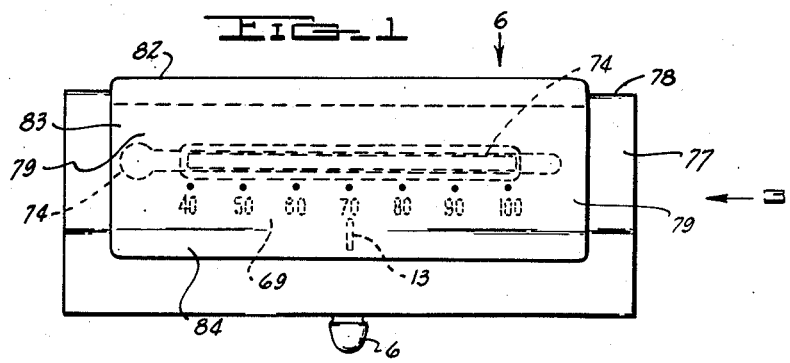
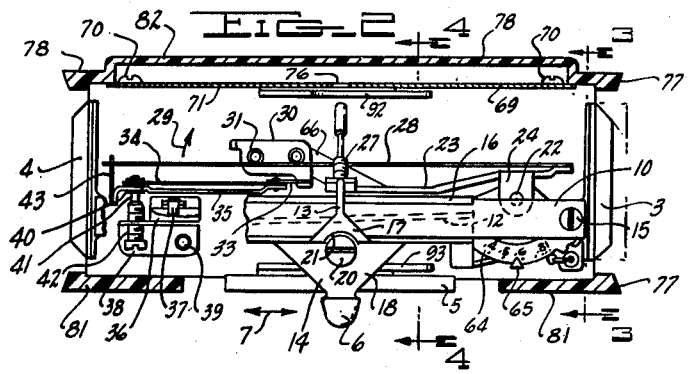
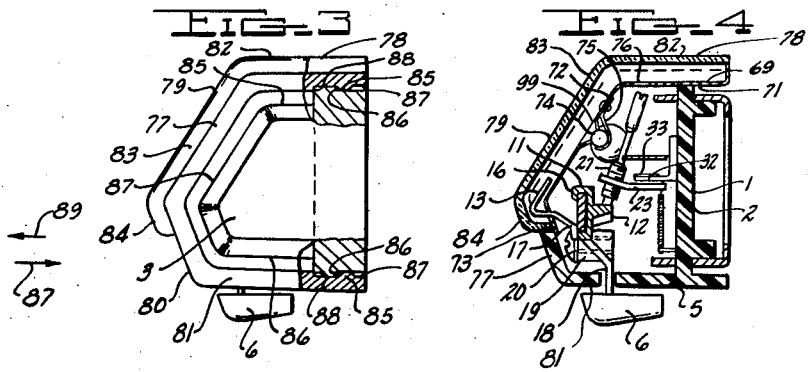
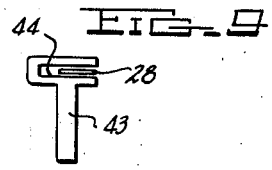
INVENTOR.
JACK E. FLEURY
BY
SMITH, OLSEN & KOTTS
ATTORNEYS

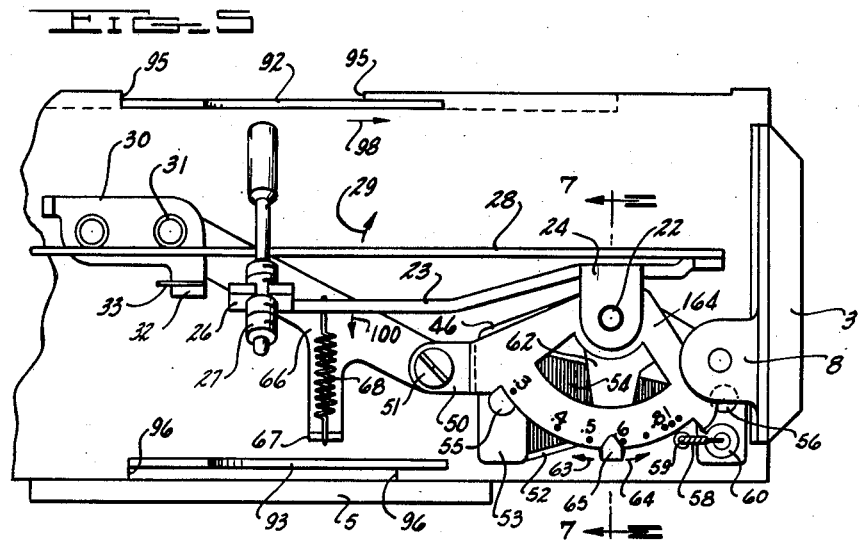
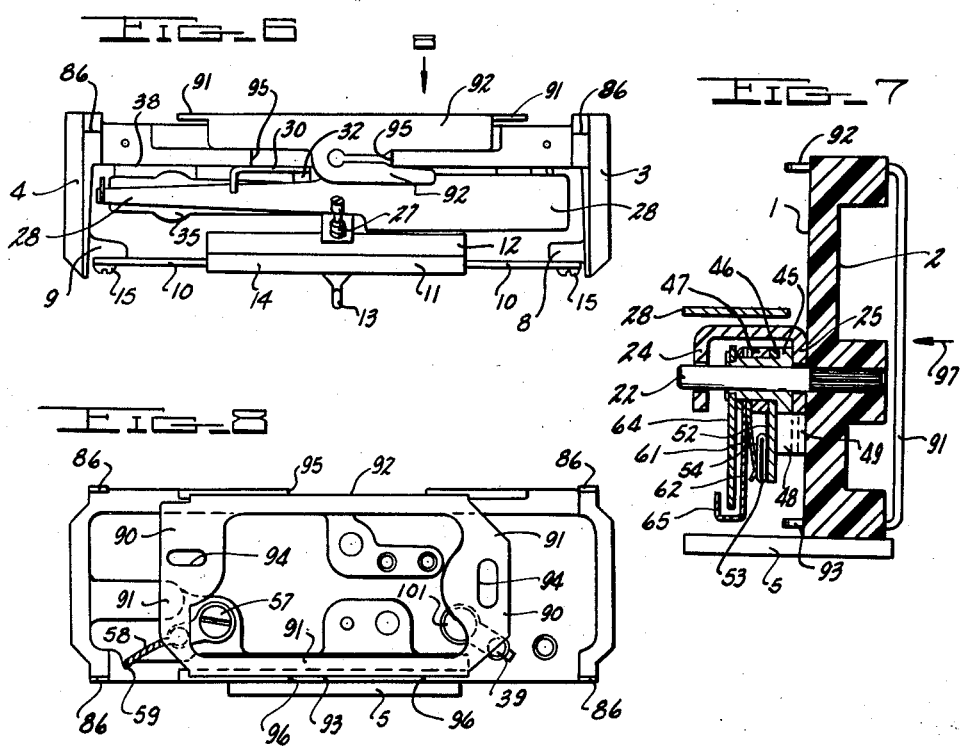

United States Patent Office 2,799,749
Patented July 16, 1957

2,799,749

HORIZONTAL TYPE THERMOSTAT

Jack E. Fleury, Detroit, Mich., assignor to Detroit Controls Corporation, Detroit, Mich., a corporation of Michigan Application January 27, 1956, Serial No. 561,853

20 Claims. (Cl. 200—139)

This invention relates to a room thermostat for use in controlling the operation of a room-heating furnace.

Thermostats of the instant type usually comprise a housing in which is contained a room temperature indicator, a temperature responsive power element, a switch controlled by said power element, and manually operable mechanism for adjusting the power element relative to the switch whereby to allow switch actuation at various different temperatures in accordance with the desires of the room occupant. The switch is in the controlling circuit for the furnace, and switch actuation controls starting and stopping of the furnace.

In some instances the power element lags behind the room temperature in its switch-actuating movement. For example, when the room temperature begins to fall below the "temperature setting" of the power element adjusting mechanism the power element may not cool immediately in response to room temperature change. As a result the room temperature may drop considerably below the temperature setting before the thermostat switch is actuated to start the furnace.

In order to prevent extreme room temperature fluctuations a resistance heater is sometimes put in series with the thermostat switch, and the power element adjusting mechanism is set to start the switch-actuating action before the room temperature falls to the temperature setting. In operation, when the room temperature begins to fall below the temperature setting the power element has already started to actuate the switch (due to the false setting of the adjusting mechanism). As soon as the switch is actuated the resistance heater begins to heat up the power element so as to compensate for its inability to heat up immediately in response to room temperature increase by the furnace. The heat output of the resistance heater is controlled in such manner that the power element effects switch actuation at the temperature setting.

Objects of the present invention are to provide a thermostat wherein:

1. An economical heater mechanism is employed to compensate for movement lag in the temperature responsive power element,
2. The thermostat switch contacts make firm electrical contact with each other so as to prevent current interruption except under the influence of the power element,
3. The internal mechanisms of the thermostat are of such construction and arrangement as to permit employment of a dial having widely spaced and easily read temperature graduations,
4. The power element adjusting mechanism for the thermostat undergoes a comparatively large movement per temperature change adjustment so as to reduce the effect of any given error from desired temperature setting,
5. The dial graduations of the thermostat are easily read whether the thermostat is placed high or low on the room wall,
6. The internal mechanisms of the thermostat are protected from the clogging effects of falling dust,
7. Room air is permitted to circulate freely around the thermostat power element,
8. The power element for the thermostat may be repositioned relative to its adjusting mechanism (so as to compensate for manufacturing errors) without removing the thermostat dial, and
9. The thermostat may be produced at relatively low cost.

Other objects of this invention will appear in the following description and appended claims, reference being had to the accompanying drawings forming a part of this specification wherein like reference characters designate corresponding parts in the several views.

In the drawings:

Fig. 1 is a front view of one embodiment of the invention,

Fig. 2 is a view taken in the same direction as Fig. 1 with parts broken away and other parts in section for illustration purposes, Fig. 3 is an end view of the Fig. 1 embodiment with parts broken away along line 3—3 in Fig. 1, Fig. 4 is a sectional view along line 4—4 in Fig. 2, Fig. 5 is an enlarged fragmentary view taken in the same direction as Fig. 2 but with additional parts broken away for illustration purposes, Fig. 6 is a top plan view taken in the direction of arrow 6 in Fig. 1 with the cover and dial plate removed for illustration purposes, Fig. 7 is a sectional view on line 7—7 in Fig. 5, Fig. 8 is a rear view along arrow 8 in Fig. 6, and Fig. 9 is an elevational view of a lost motion link employed in the Fig. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a room thermostat comprising a support 1 of dielectric material. Support 1 includes a web portion 2 and end portions 3 and 4. A horizontal floor portion 5 extends integrally from web portion 2 and serves to conceal the inner working mechanisms of the thermostat from the gaze of persons viewing the thermostat. Floor portion 5 also provides a guide surface for facilitating manual movement of knob 6 in the directions of arrows 7 (see Fig. 2) without the user's finger extending into contact with the delicate inner working mechanisms.

Extending integrally from the forward ends of end portions 3 and 4 are two lug portions 8 and 9 (see Fig. 6), and spanning the space between these lug portions is a guide member in the form of a bar member 10. Screws 15 mount member 10 on lug portions 8 and 9.

Slidably disposed on member 10 for movement in the arrow 7 direction is a slide member 14, preferably formed of nylon. Member 14 is of one piece molded construction and includes a slide portion 11, a cam portion 12, a pointer portion 13, and the previously mentioned knob portion 6. Slide portion 11 includes a downwardly extending wall portion 16 and an upwardly extending triangular wall portion 17. Wall portions 16 and 17 serve to prevent inadvertent displacement of member 14 from bar member 10. Knob 6 is interconnected with slide portion 11 by a wall portion 18. An internally threaded barrel portion 19 (Fig. 4) extends horizontally from wall portion 18, and a headed screw 20 is threaded into barrel portion 19. A semi-circular opening 21 (Fig. 2) is formed in wall portion 17 so as to put the head of screw 20 in registry with bar member 10. If member 14 should slide too loosely on member 10 (as by reason of inaccuracy in the dimension of members 10 or 14) screw 20 can be threaded into barrel 19 until the screw head exerts a light frictional drag on member 10. This light drag will compensate for any looseness in fit between members 10 and 14.

A brass pin 22 projects forwardly from support 1 so as to provide a pivot for an arm 23. Arm 23 is provided with ears 24 and 25 to effect the pivotal connection with pin 22. The free end of arm 23 terminates in an internally threaded extension 26 which receives a screw 27. Screw 27 registers with cam portion 12, and it will be appreciated that movement of slide member 14 in the arrow 7 directions will (through the interaction of screw 27 and cam portion 12) cause pivotal movement of arm 23 around the axis of pin 22.

Arm 23 carries a multi-metallic, temperature responsive, power member 28. Member 28 is of such construction that on temperature increase in the surrounding atmosphere member 28 tends to move around its connection with arm 23 in the direction of arrow 29 (see Figs. 2 and 5).

A bracket 30, preferably formed of brass or other electrically conducting material, is secured to web portion 2 by rivets 31. Bracket 30 includes a forwardly extending lug portion 32 which carries a copper strip 33, which in turn carries a longer but thinner copper strip 34 and an armature-forming strip 35. Strip 35 is formed of an iron alloy to permit its being attracted by permanent magnet 36. Magnet 36 is a cylindrical cup-shaped member with a vertical slot running axially through its upper portion. The opposed walls formed by said slot make up the poles of the magnet. A rivet 37 extends through the center of magnet 36 into a brass bracket 38. Rivets 39 (only one of which is visible in Fig. 2) mount bracket 38 on support 1.

When armature 35 is sufficiently close to magnet 36 it will be attracted by the magnet and held in a position adjacent the magnet poles. Strip 33 carries a contact element 40 which extends through an opening in armature 35. Element 40 registers with a contact element 41 carried by a screw 42 threaded through bracket 38. When armature 35 is closely adjacent magnet 36 contacts 40 and 41 are closed to complete an electric circuit through the thermostat. Strip 34 furnishes a low resistance electrical path through the circuit, and armature 35 cooperates with magnet 36 to hold contacts 40 and 41 in firm electrical engagement with each other.

A wand or link 43 is secured on the downturned end of armature 35. Wand 43 is slotted at 44 to loosely receive the free end of power member 28. On temperature increase in the atmosphere surrounding member 28 said member moves in the direction of arrow 29 to lift wand 43 and contact 40 away from contact 41 so as to break the electrical circuit through the thermostat.

To prevent extreme fluctuations in room temperature there is preferably provided a heater for member 28. The heater (and adjustment mechanism therefor) is mounted on the same pivot pin 22 which mounts arm 23 and power element 28. A brass bushing 45 encircles pin 22. A brass plate 46 is positioned around bushing 45, and a brass spacer 47 is positioned around bushing 45 against plate 46. Plate 46 includes a rearwardly extending extension 48 (Fig. 7) and a laterally extending ear 49 (positioned behind ear 50 shown in Fig. 5). A screw 51 extends through ear 49 (as well as ear 50) to cooperate with pin 22 in the securement of plate 46 on support 1. Secured on plate 46 is a thin sheet of dielectric material 52, and positioned on sheet 52 is a thicker strip of dielectric material 53. Resistance heater wire 54 is coiled around strip 53; and rivets 55 and 56 are extended through elements 53, 52 and 46 to fixedly mount the resistance heater formed by wire 54. The lead in mechanism for the heater includes a screw terminal 57 (Fig. 8), a wire 58 extending from terminal 57 through an opening 59 in support 2, and a metallic button 60 affixed on the right end of strip 53. The right end of wire 54 is affixed on button 60, and the left end of wire 54 is anchored on strip 53.

The heater should put out the same heat or wattage regardless of possible differences in current carried by the heating plant load, and accordingly the resistance of the heater must be varied with different amperages through the heater. In this connection the heater in this thermostat is in series with the load, and any differences in amperage through the load will occur also in the heater. The resistance of the heater in the present thermostat is varied by short circuiting heater turns as required. This short circuiting is accomplished by means of a copper arm 61 rotatably mounted on bushing 45. Arm 61 is fixedly secured on a manually actuable arm 62, and when arm 62 is moved from its Fig. 5 position in the direction of arrow 63 the lower end of arm 61 rides along turns 54 so as to put more of the turns in electrical communication with terminal 57, thereby increasing the resistance of the heater and causing the heater to furnish a constant supply of heat to element 28, regardless of current flow through the heater turns. When arm 62 is moved in the direction of arrow 64 the resistance of the heater is decreased. A dial plate 164 is positioned on the outer end of bushing 45, and screw 51 extends through ear 50 of plate 164 to secure said plate in fixed position. Arm 62 is provided with a turned up end portion 65 which functions as a manual engagement means and pointer mechanism for dial plate 164. Dial plate 164 is calibrated in amperes through the heater, and the heater resistance is automatically adjusted to give the desired heater wattage by turning arm 62 to the position on dial plate 164 corresponding to the heater current value.

Arm 61 is in electrical engagement with spacer 47 and plate 46. Current from coils 54 flows through arm 61, spacer 47, plate 46, ear 49 and conductor strip 66. Screw 51 holds one end of strip 66 on support 1, and rivet 31 holds the other end of strip 66. Strip 66 is set in a recess in web portion 2 so as not to project beyond the forward face of the web portion and interfere with the mounting of bracket 30. The lower end of strip 66 is turned forwardly at 67 to mount the lower end of a tension coil spring 68. The upper end of spring 68 is affixed to arm 23. The purpose of spring 68 is to hold screw 27 against cam portion 12.

A dial member 69 is secured on web portion 2 by screws 70. Member 69 includes a top portion 71, a rearwardly inclining front portion 72, and a rearwardly declining portion 73. An elongated opening 99 is provided in portion 72, and a thermometer 74 is secured on the rear face of portion 72 by means of clips 75. Opening 99 allows easy viewing of the thermometer. Portion 71 is provided with a central opening 76 which allows a screw driver (not shown) to turn screw 27 without removing dial member 69.

A plastic cover member 77 overlies dial member 69. Member 77 includes a top portion 78, a rearwardly inclining upper front portion 79, a rearwardly declining lower front portion 80, and a bottom portion 81. The central areas of portions 78 and 79 are offset relative to the end areas thereof to provide raised portions 82 and 83. The upper central area of front portion 80 is also offset to provide a raised portion 84. Cover member 77 is formed of a transparent plastic. All wall areas of the cover member are painted except raised portions 82, 83 and 84 which are left transparent for viewing purposes.

It will be noted that member 77 has no end walls, and that in the installed position the upper, lower and front edges 85, 86, and 87 of end portions 3 and 4 (Fig. 3)

are spaced from the corresponding surfaces of the cover member. The formed spaces allow for circulation of room air around power member 28. To further aid the air circulation floor portion 5 is spaced from bottom portion 81, both laterally and rearwardly (see Figs. 2 and 4). Top portion 78 overlies the entire thermostat to prevent dust from entering the thermostat interior.

Mounting of cover member 77 on support 1 is effected by buttons 85 formed on top wall 78 and bottom wall 81 adjacent the lateral edges thereof. These buttons releasably lock the cover member in place by abutting against shoulders 86 formed at the four corners of web portion 2. Installation of member 77 is effected by sliding it onto support 1 in the direction of arrow 87 (Fig. 3). Cover member 77 has no end walls, and walls 78 and 81 can therefore spring apart slightly to permit the installation operation. Buttons 85 project from recesses 87. These recesses form shoulders 88 which abut against forward face portions of web portion 2 so as to limit movement of member 77 in the arrow 87 direction. Web portion 2 is thereby locked between shoulders 88 and buttons 85 so as to hold cover member securely in place. However, manual removal of cover member 77 may be effected by a straight line pull on member 77 in the direction of arrow 89.

In order to mount the thermostat on the room wall there is provided a bracket 90. Bracket 90 includes a frame-like web portion 91, an upper hook-shaped end portion 92, and a lower hook-shaped end portion 93. Web portion 91 is provided with elongated openings 94 for reception of wall screws (not shown). In order to accommodate bracket 90 support 1 is slotted at 95 and 96. Hook portion 92 extends through slot 95 and clampingly engages opposite faces of web portion 2. Hook portion 93 is similar in shape to hook portion 92, and extends through slot 96 so as to clampingly engage opposite faces of web portion 2. Slots 95 and 96 are made longer than the corresponding dimensions of hooks 92 and 93 so as to permit insertion of the hooks in the direction of arrow 97 (Fig. 7), followed by sliding movement in the direction of arrow 98 (Fig. 5). Bracket 90 can be installed on the room wall prior to assembly with the thermostat, and thereafter the thermostat can be slipped onto the bracket.

In use of the thermostat, knob 6 is manually moved in the arrow 7 directions (Fig. 2) to give different temperature settings. Pointer 13 travels with knob 6 and indicates the temperature setting on dial 69.

Movement of knob 6 to the right in Fig. 2 raises the temperature setting, and movement of knob 6 to the left in Fig. 2 lowers the temperature setting.

Movement of knob 6 to the right causes cam 12 to move to the right, and since cam 12 declines from right to left, the portion of cam 12 in registry with screw 27 is lowered. Spring 68 causes screw 27 to be engaged with cam 12 so that screw 27 is lowered during rightward movement of cam 12. Lowering movement of screw 27 is translated into pivotal movement of arm 23 around pin 22 in the direction of arrow 100 (Fig. 5). Power element 28 is carried by arm 23 and likewise moves in the arrow 100 direction. If the temperature setting of pointer 13 is above the room temperature indicated by thermometer 74 power element 28 will be lowered sufficiently to close contacts 40 and 41. It will be recalled that element 28 tends to move in the direction of arrow 29 in response to room temperature increase. Since increase in the pointer 13 setting tends to move element 28 down, and increase in room temperature tends to move element 28 up, the final position of element 28 will be determined by the difference between the temperature setting and room temperature. If the temperature setting is higher than the room temperature element 28 closes contacts 40 so as to complete an electric circuit through the thermostat. This electric circuit is through terminal 57, wire 58, button 60, coils 54, arm 61, spacer 47, plate 46, ear 49, strip 66, bracket 30, strips 33 and 34, contacts 40 and 41, screw 42, bracket 38, rivet 39 and terminal 101 (Fig. 8). All of the elements in the electric circuit (except contacts 40 and 41) are preferably formed of copper or brass for conduction purposes. Contact 40 is locked in arm 35 as well as strip 34, and when arm 35 is attracted by magnet 36 contact 40 snaps into firm electrical engagement with contact 41. The action of magnet 36 on arm 35 is such that when the pointer 13 temperature setting approaches the room temperature contact 40 moves with a quick snapping action into or out of engagement with contact 41, according as the room temperature is falling below the pointer 13 setting or rising above the pointer 13 setting.

When contacts 40 and 41 are closed heater turns 54 furnish heat to element 28 in an amount determined by the position of arm 61. The heat from turns 54 compensates for any time lag between room temperature change and power element movement. Thus, as the room is being heated by the furnace additional heat from turns 54 causes element 28 to keep pace with room temperature change, and thereby open contacts 40 and 41 as soon as the room temperature reaches the pointer 13 temperature setting. When the room temperature falls below the pointer 13 setting it is desirable that element 28 immediately close contacts 40 and 41; otherwise the room will be exposed to an extremely large temperature drop before the furnace is put into operation. Element 28 does not instantly respond to room temperature change, and it is therefore necessary that element 28 close contacts 40 and 41 while its actual temperature is still above the room temperature and pointer 13 setting. The adjustment provided by screw 27 compensates for inaccuracies in power element construction and allows said element to be set for contact closing at the desired temperature. Turning screw 27 down in arm 23 raises element 28 away from contact 41, and turning screw 27 up in arm 23 lowers element 28 toward contact 41, so as to allow the power element to close contacts 40 and 41 while its temperature is above the room temperature. Since the power element lags behind the room temperature the contacts will close when the room temperature is at (or very slightly below) the pointer 13 temperature setting.

As soon as contacts 40 and 41 are closed the furnace goes into operation, and coils 54 begin furnishing heat to element 28. Heat from coils 54 compensates for the inability of element 28 to move immediately in response to room temperature increase. As a result switch contacts 40 and 41 are opened very slightly above the pointer 13 temperature setting.

The adjustment provided by screw 42 varies the relative positions of contact 41 and magnet 36, and thereby determines the position of arm 35 in relation to magnet 36 when contact 40 and 41 are closed. The nearer arm 35 is to magnet 36 the greater will be the magnet force tending to hold contacts 40 and 41 together. It is desirable that the contacts be held firmly together, but if the holding force provided by magnet 36 is too great it will prevent timely movement of element 28 in the arrow 29 direction during room temperature increase. Therefore, screw 42 is so adjusted relative to magnet 36 that the magnet holding force will be strong enough to hold the contacts firmly together without preventing timely movement of element 28 during room temperature increase.

The rearwardly inclined directions of cover portion 79 and dial portion 72 permits easy visual observation of thermometer 74 and the indicia on dial 69 whether the thermostat is placed high on the room wall or low on the room wall.

The horizontally elongated character of the thermostat provides a construction which is relatively compact in appearance without sacrifice in the dial 69 graduation spacings. The dial 69 graduations are spaced quite far apart so as to minimize the effect of any error in movement of knob 6 to its intended position.

The construction of the illustrated thermostat is such that dial graduations 69 are utilized both to indicate the room temperature and temperature setting. As a result the viewer of the thermostat is enabled to visually compare the room temperature with the temperature setting without having to change his gaze back and forth between two separate dials, as is required in certain of the prior art thermostats.

I claim:

1. A thermostat comprising a support; a temperature responsive power member movably mounted on said support; switch means operatively connected with said power member for actuation thereby; a manually movable cam member mounted for rectilinear movement on said support; and mechanism between said power member and cam member for translating movement of said cam member into adjusting movement of the power member relative to the switch means, whereby to vary the temperature at which the power member actuates the switch means.

2. A thermostat comprising a support; a temperature responsive power member movably mounted on said support; switch means operatively connected with said power member for actuation thereby; a manually movable cam member mounted for rectilinear movement on said support; mechanism between said power member and cam member for translating movement of said cam member into adjusting movement of the power member relative to the switch means, whereby to vary the temperature at which the power member actuates the switch means; said translating mechanism including an adjusting means for varying the position of the power member relative to the cam member, whereby to vary the position of the power member relative to the switch means at any given temperature so as to compensate for any inaccuracies in the relative positions of the switch means, power member and cam member.

3. A thermostat comprising a support; an arm pivotally mounted on said support; a temperature responsive power member carried by said arm; switch means operatively connected with said power member for actuation thereby; a manually movable cam member mounted for rectilinear movement on said support; and means projecting from said arm into engagement with said cam member, whereby movement of said cam member causes said arm to move about its pivot and adjust the power member relative to the switch means, the adjustment of said power member serving to vary the temperature at which the switch is actuated.

4. A thermostat comprising a support; an arm pivotally mounted on said support; a temperature responsive power member carried by said arm; switch means operatively connected with said power member for actuation thereby; a manually movable cam member mounted for rectilinear movement on said support; and a screw threadedly engaged with said arm, said screw projecting through said arm into engagement with said cam member, whereby movement of said cam member causes said arm to move about its pivot and adjust the power member relative to the switch means, the adjustment of said power member serving to vary the temperature at which the switch is actuated.

5. A thermostat comprising a support; an arm; pivot means between said support and one end of said arm; an elongated temperature responsive power member secured on said one end and extending along said arm to a point therebeyond; switch means operatively connected with the free end of said power member for actuation in response to power member movement; a manually movable cam member mounted for rectilinear movement on said support; and means projecting from said arm into engagement with said cam member, whereby movement of said cam member causes said arm to move about its pivot and adjust the power member relative to the switch means, the adjustment of said power member serving to vary the temperature at which the switch is actuated.

6. A thermostat comprising a support; an arm; pivot means between said support and one end of said arm; an elongated temperature responsive power member secured on said one end and extending along said arm to a point therebeyond; switch means operatively connected with the free end of said power member for actuation in response to power member movement; a manually movable cam member mounted for rectilinear movement on said support; and a screw threadedly engaged with said arm, said screw projecting through said arm into engagement with said cam member, whereby movement of said cam member causes said arm to move about its pivot and adjust the power member relative to the switch means, the adjustment of said power member serving to vary the temperature at which the switch is actuated.

7. A thermostat comprising a support; an arm pivotally mounted on said support; a temperature responsive power member carried by said arm; switch means operatively connected with said power member for actuation thereby; a manually movable cam member mounted for rectilinear movement on said support; a screw threadedly engaged with said arm; said screw projecting through said arm into engagement with said cam member; a dial member overlying said arm, power member and switch means; said dial member having an opening in registry with said screw to permit turning thereof without removing the dial member.

8. A thermostat comprising a support; said support including a vertical web portion and right angularly disposed end wall portions; switch means carried by said support; temperature responsive power means carried by said support and operatively engaged with said switch means; a manually movable cam member mounted for rectilinear movement on said support; mechanism between said cam member and power means for adjusting the position of the power means relative to the switch means in response to movement of the cam member; a dial member secured on said support and overlying the switch means and power means; said dial member being spaced from the end wall portions to provide openings for the circulation of air around the power means; and a horizontally disposed thermometer carried by the dial member.

9. A thermostat comprising a support; said support including a vertical web portion and right angularly disposed end wall portions; switch means carried by said support; temperature responsive power means carried by said support and operatively engaged with said switch means; a horizontal guide member extending between the end wall portions forwardly of the switch means and power means; a cam member slidably positioned for rectilinear movement on said guide member; mechanism between said power means and cam member for translating movement of said cam member into adjusting movement of the power means relative to the switch means; a manually engageable element carried by said cam member; a dial member secured on said support and overlying the switch means and power means; said dial member being spaced from the end wall portions to provide openings for the circulation of air around the power means; a pointer carried by the cam member and extending in front of the dial member; a thermometer horizontally disposed in back of said dial member; and an elongated opening in said dial member in registry with said thermometer.

10. A thermostat comprising a support; said support including a vertical web portion and right angularly disposed end wall portions; switch means carried by said support; temperature responsive power means carried by said support and operatively engaged with said switch means; a horizontal guide member extending between the end wall portions forwardly of the switch means and power means; a cam member slidably positioned for horizontal rectilinear movement on said guide member; mechanism between said power means and cam member for translating movement of said cam member into adjusting movement of the power means relative to the switch means; a manually engageable element carried by said cam member; a dial member secured on said support and overlying the switch means and power means; said dial member being spaced from the end wall portions to provide openings for the circulation of air around the power means; a pointer carried by the cam member and extending in front of the dial member.

11. A thermostat comprising a support; said support including a vertical web portion and right angularly disposed end wall portions; switch means carried by said support; temperature responsive power means carried by said support and operatively engaged with said switch means; mechanism carried by said support for varying the switch-actuating temperature of said power means; a manually actuable element projecting below the support for operating said mechanism; said mechanism including a cam member carried by the manually actuable element and mounted for horizontal rectilinear movement along said support, and an element carried by the power means slidably engaging the cam member; a dial member carried by the support and overlying the switch means and power means; said dial member including a top portion and a front portion inclined from front to rear; a pointer carried by said mechanism and extending in front of the dial member; and a cover overlying the dial member; said cover including a transparent portion in registry with the dial member front portion; said support including rearwardly facing shoulder portions on the upper and lower edges of the support at the lateral limits thereof; said cover including top and bottom walls having detent portions engaged with said shoulder portions.

12. A thermostat comprising a support; said support including a vertical web portion and right angularly disposed end wall portions; switch means carried by said support; temperature responsive power means carried by said support and operatively engaged with said switch means; mechanism carried by said support for varying the switch-actuating temperature of said power means; a manually actuable element projecting below the support for operating said mechanism; said mechanism including a cam member carried by the manually actuable element and mounted for horizontal rectilinear movement along said support, and an element carried by the power means slidably engaging the cam member; a dial member carried by the support and overlying the switch means and power means; said dial member including a top portion and a front portion inclined from front to rear; a pointer carried by said mechanism and extending in front of the dial member; and a cover overlying the dial member; said cover including a transparent portion in registry with the dial member front portion.

13. A thermostat comprising a support; switch means carried by said support; temperature responsive power means carried by said support and operatively engaged with said switch means; mechanism carried by said support for varying the switch-actuating temperature of said power means; a manually actuable element projecting below the support for operating said mechanism; said mechanism including a cam member carried by the manually actuable element and mounted for horizontal rectilinear movement along said support, and an element carried by the power means slidably engaging the cam member; a dial member carried by the support and overlying the switch means and power means; said dial member including a top portion and a front portion inclined from front to rear; a pointer carried by said mechanism and extending in front of the dial member; and a cover overlying the dial member; said cover including a transparent portion in registry with the dial member front portion.

14. A thermostat comprising a support; said support including a vertical web portion and right angularly disposed end wall portions; switch means carried by said support; temperature responsive power means carried by said support and operatively engaged with said switch means; a horizontal guide member extending between the end wall portions forwardly of the switch means and power means; a cam member slidably positioned for horizontal rectilinear movement on said guide member; mechanism between said power means and cam member for translating movement of said cam member into adjusting movement of the power means relative to the switch means; a manually engageable element carried by said cam member and projecting below the support; a dial member carried by the support and overlying the switch means and power means; said dial member including a top portion, and a front portion inclined from front to rear; said end wall portions terminating rearwardly of the dial member to provide openings for the circulation of air around the power means; a pointer carried by the cam member and extending in front of the dial member; and a cover overlying the dial member; said cover including a transparent portion in registry with the dial member front portion.

15. A thermostat comprising a support; switch means carried by said support; temperature responsive power means carried by said support and operatively engaged with said switch means; a guide member carried by said support and extending forwardly of the switch means and power means; a cam member slidably positioned for rectilinear movement on said guide member; mechanism between said power means and cam member for translating movement of said cam member into adjusting movement of the power means relative to the switch means; a manually engageable element integrally formed with said cam member; a dial member secured on said support and overlying the switch means and power means; a pointer extending integrally from said cam into a position in front of the dial member; and a headed screw extended into the cam member with its head in registry with the guide member, whereby any looseness in fit between the cam member and guide member can be alleviated by turning the screw toward the guide member.

16. A thermostat comprising a support; switch means carried by said support; temperature responsive power means carried by said support and operatively engaged with said switch means; a guide member carried by said support and extending forwardly of the switch means and power means; a cam member slidably positioned for rectilinear movement on said guide member; mechanism between said power means and cam member for translating movement of said cam member into adjusting movement of the power means relative to the switch means; a manually engageable element integrally formed with said cam member; a dial member secured on said support and overlying the switch means and power means, a pointer extending integrally from said cam member into a position in front of the dial member.

17. A thermostat comprising a support; a bracket secured on said support; a contact element threadedly engaged with said bracket and projecting therethrough; a permanent magnet adjacent said contact element; a second bracket on said support; a non-magnetic, electrically conductive spring arm extending from said bracket and carrying a contact element in registry with said first contact element; a magnet-attractable arm carried by said spring arm and in registry with the magnet; a temperature responsive power element mounted on said support; a lost motion link between said power element and magnet-attractable arm; a manually movable cam member mounted for rectilinear movement on said support; and mechanism between said power element and cam member for translating movement of said cam member into adjusting movement of the power element so as to vary the position of the second contact element relative to the first contact element at any given temperature.

18. A thermostat comprising a support; a shaft projecting from said support; a plate mounted on said shaft and having an offset portion secured to said support; a resistance coil secured on said plate; a contact arm pivotally mounted on said shaft for arcuate movement along the resistance coil; a second arm pivotally mounted on said shaft; a manually movable cam member mounted for rectilinear movement on said support; means between said second arm and cam member for translating movement of the cam member into pivotal movement of the arm; a multi-metallic element secured on said second arm; a bracket secured on said support; a contact element mounted on said bracket; a second bracket secured on said support; an electrically conducting arm projecting from said second bracket; a second contact element carried by said electrically conducting arm in registry with said first contact element; motion-transmitting means between said multi-metallic element and second contact element; and electrical conductor means between the plate and second bracket.

19. A thermostat comprising a support; a shaft projecting from said support; a plate mounted on said shaft and having an offset portion secured to said support; a resistance coil secured on said plate; a contact arm pivotally mounted on said shaft for arcuate movement along the resistance coil; a second arm pivotally mounted on said shaft; a manually movable cam member mounted for rectilinear movement on said support; means between said second arm and cam member for translating movement of the cam member into pivotal movement of the arm; a multi-metallic element secured on said second arm; switch means operatively connected with said multi-metallic element; and electrical conductor means interconnecting the plate and switch means.

20. The combination comprising a support wall; switch means carried by said wall; temperature-responsive power means carried by said wall and operatively engaged with said switch means; a manually movable cam member mounted for horizontal rectilinear movement in front of said support wall; mechanism carried by the power means and cam member for translating movement of said cam member into adjusting movement of the power means relative to the switch means; and wall-mounting bracket means removably engaged with said support wall; said bracket means including a web portion, and parallel hook-shaped end portions extending from the web portion through slots in the support wall and clampingly engaging opposite faces thereof.

References Cited in the file of this patent
UNITED STATES PATENTS

| | | |
|---|---|---|
| 1,934,607 | Bauman | Nov. 7, 1933 |
| 2,171,272 | Kronmiller et al. | Aug. 29, 1939 |
| 2,173,083 | Ray | Sept. 12, 1939 |
| 2,493,190 | Fuchs | Jan. 3, 1950 |